United States Patent
Silc

(10) Patent No.: US 6,738,089 B1
(45) Date of Patent: May 18, 2004

(54) IMAGE RECORDING SYSTEM AND METHOD

(75) Inventor: Ronald G. Silc, Park Forest, IL (US)

(73) Assignee: Computron Display Systems, Mount Prospect, IL (US)

( * ) Notice: Subject to any disclaimer, the term of this patent is extended or adjusted under 35 U.S.C. 154(b) by 468 days.

(21) Appl. No.: 09/698,949

(22) Filed: Oct. 26, 2000

(51) Int. Cl.⁷ ................................................. H04N 7/18
(52) U.S. Cl. ...................................... 348/148; 348/143
(58) Field of Search ...................... 348/36–39, 143–148

(56) References Cited

U.S. PATENT DOCUMENTS

| | | | |
|---|---|---|---|
| 1,418,033 A | | 5/1922 | Sutcliffe |
| 4,100,571 A | * | 7/1978 | Dykes et al. ................. 348/37 |
| 4,484,805 A | | 11/1984 | Gizzio |
| 5,027,200 A | | 6/1991 | Petrossian et al. |
| 5,289,321 A | | 2/1994 | Secor |
| 5,382,953 A | | 1/1995 | Hauptli |
| 5,563,650 A | * | 10/1996 | Poelstra ........................ 348/36 |
| 5,570,127 A | | 10/1996 | Schmidt |
| 5,793,420 A | | 8/1998 | Schmidt |
| 5,874,989 A | * | 2/1999 | O'Brien et al. ............. 348/148 |
| 6,002,430 A | * | 12/1999 | McCall et al. ......... 348/207.99 |
| 6,078,355 A | * | 6/2000 | Zengel ........................ 348/148 |

* cited by examiner

*Primary Examiner*—Andy Rao
(74) *Attorney, Agent, or Firm*—Fitch, Even, Tabin & Flannery

(57) ABSTRACT

A camera system and method are provided which are particularly well-suited for use in school buses for recording vehicles violating the stop-arm on the bus. The system and method provide advantages in terms of the ability to record both oncoming and upcoming vehicles relative to the bus that violate the stop-arm via one camera mounted to the bus and a redirecting mechanism disposed in the camera's field of view. More particularly, the redirecting mechanism can be a prism having reflective surfaces mounted in front of the lens of the camera with the surfaces oriented to redirect images from forward and rearward of the stop-arm through the camera lens. A video recording mechanism records the images redirected through the lens. In a preferred form, a video display monitor displays the images redirected through the lens to the driver of the school bus.

15 Claims, 3 Drawing Sheets

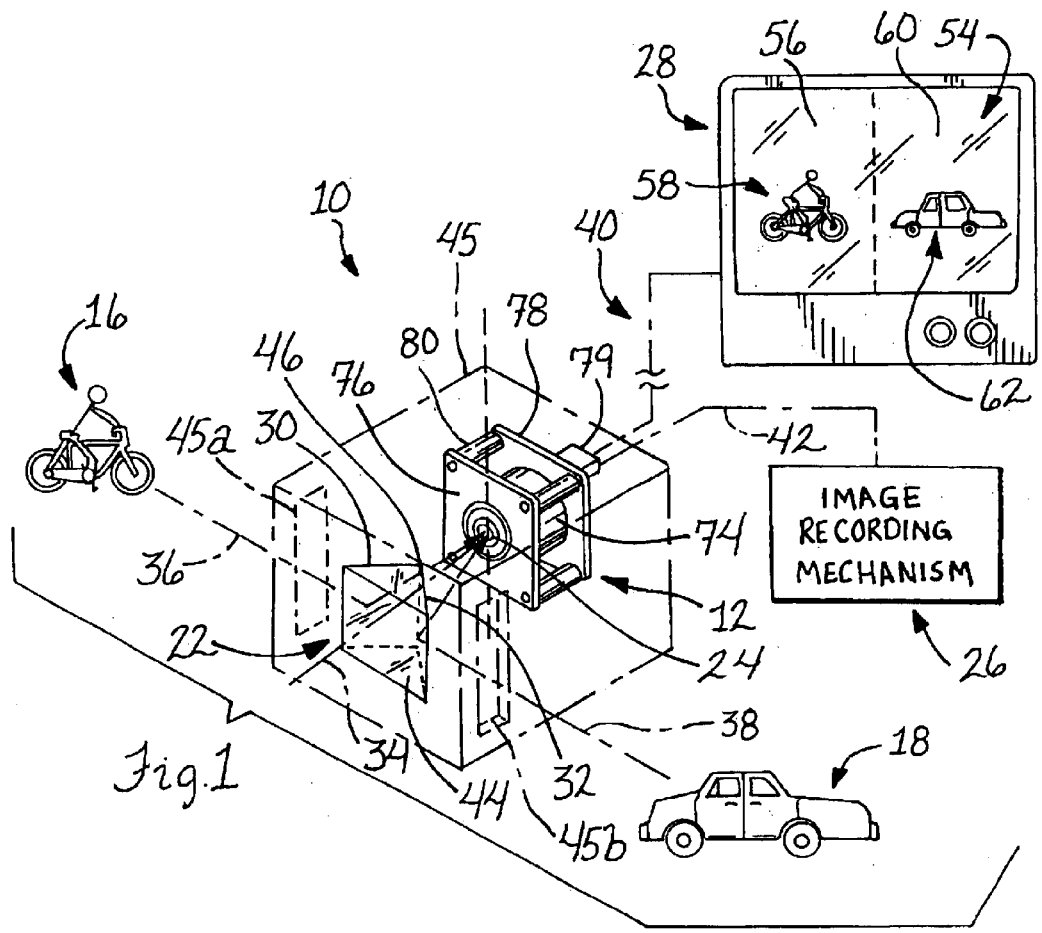
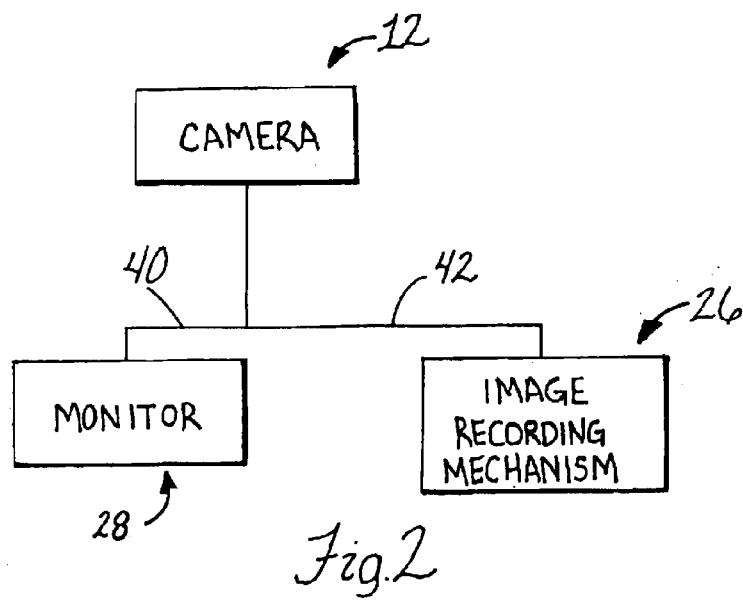

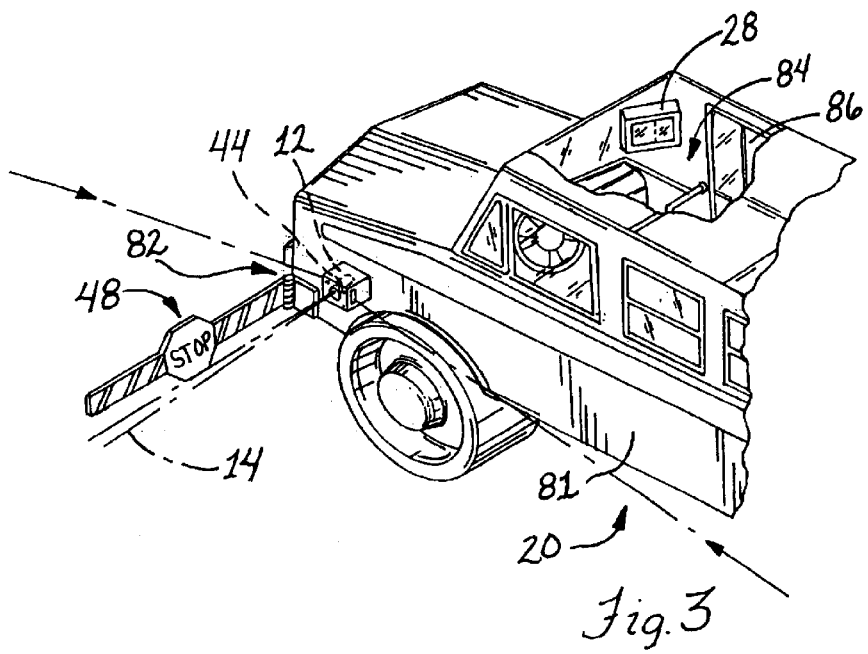
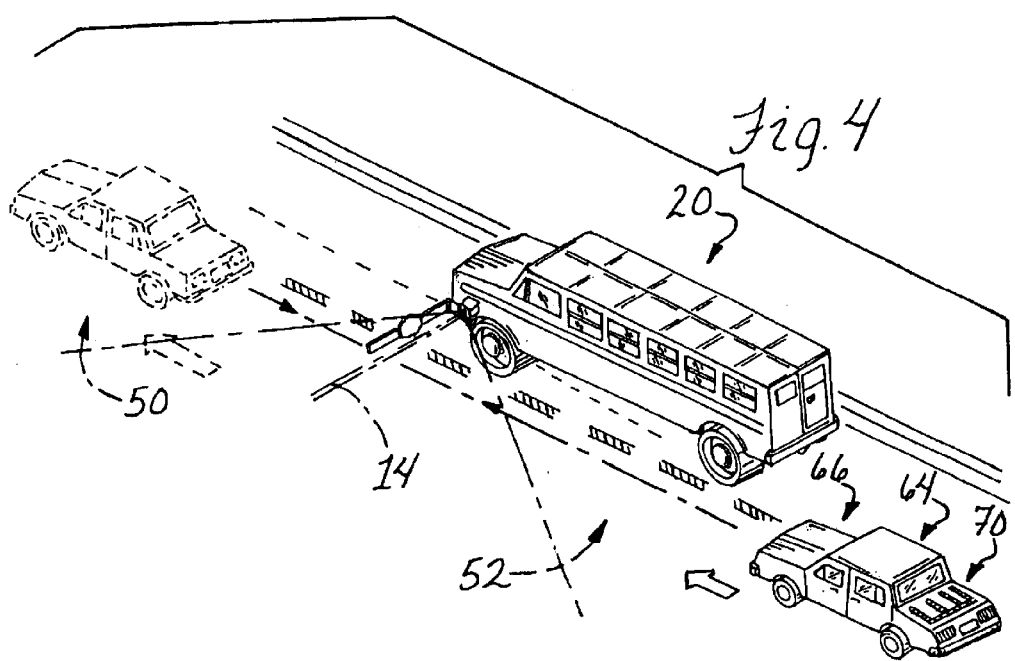

IMAGE RECORDING SYSTEM AND METHOD

FIELD OF THE INVENTION

The invention relates to an image recording system and, more particularly, to a video recording system for recording school bus stop-arm violations.

BACKGROUND OF THE INVENTION

A typical school bus is equipped with a stop-arm that extends from the side of the school bus when the school bus is stopped and its door is opened to let people, usually children, on or off the bus. School buses can also be equipped with flashing lights on the front and rear of the bus that are activated when the school bus is stopped and its door is opened.

The stop-arm and flashers alert motorists that children are entering or exiting the school bus so that motorists can stop their vehicles to permit the children to cross the street if necessary. Motorists are also required to stop their vehicles by state motor vehicle laws. A serious hazard is created by motorists who disobey the stop-arm and flashers and continue traveling past the school bus as they endanger the safety of the children and violate the motor vehicle laws.

In an effort to record and monitor vehicles around school buses, a number of recording systems have been proposed. However, these prior recording systems face significant drawbacks in terms of the number of cameras they employ and the complexity of their installation and use which can drive up their costs and render them more difficult to install and use than is desirable.

U.S. Pat. No. 5,382,953 discloses a recording system that includes a sensor positioned on a school bus to detect vehicles violating an extended stop-arm. A camera is positioned on the exterior of the school bus toward its rear facing forwardly. In this manner, the camera only takes pictures of oncoming vehicles when the sensor, which is mounted at the front end of the bus, detects the vehicle. A detection mechanism detects the extension of the stop arm on the school bus. A control unit is operable with the sensor and the detection mechanism and provides a control signal for activating the camera upon receipt of signals from the detection mechanism that the stop-arm is extended and the sensor to indicate the presence of a vehicle in the violation zone. The camera then takes still photographs of the violating vehicle while it is adjacent to the school bus.

The recording system of U.S. Pat. No. 5,793,420 employs video cameras mounted on either side of a passenger vehicle, such as a school bus, for recording passing traffic as it is adjacent to the school bus. The cameras face either rearwardly or forwardly relative to the school bus to record passing vehicles and to record license plate numbers, respectively. A switching system is used that is responsive to detectors or a switching signal to determine which of the video cameras is in communication with the video recorder so as to select which view of passing traffic is recorded and displayed on a video screen in the school bus. Operator control over switching can be provided to allow the bus driver to switch between an interior camera and the external driver's side camera.

U.S. Pat. No. 5,027,200 teaches a system for providing enhanced viewing coverage about a vehicle using multiple cameras mounted to the exterior of the vehicle like the school bus video camera system of the '420 patent. To this end, the cameras are directed toward the direction in which viewing is desired. Accordingly, both systems suffer from the need to have several cameras to capture images from different fields of view with the complexity and cost disadvantages this entails.

The '200 patent also discloses use of a split CRT screen fed by corresponding cameras on either side of the vehicle as opposed to separate screens associated with each camera. In this manner, viewing of images from two different fields of view is done by looking at a single screen. Nevertheless, two cameras are still needed to produce these images.

Accordingly, there is a need for a simpler and/or less expensive image recording system that maximizes the viewing coverage provided about a vehicle without requiring multiple cameras. More particularly, a system that simultaneously records images from different views about a school bus in a simple and inexpensive manner is desirable.

SUMMARY OF THE INVENTION

In accordance with the present invention, an image recording system is provided for recording images from different fields of view about a vehicle that maximizes the viewing area provided by a camera of the system. To this end, the present image recording system allows for use of a single camera to capture images from desired areas about the vehicle over the field of view provided by the camera lens. More particularly, the system is especially adapted for use with a school bus for simultaneously recording images forwardly and rearwardly of the bus. The system includes a video camera mounted to the bus and a redirecting mechanism in its field of view so that images of both oncoming vehicles forward of the bus and upcoming vehicles rearward of the bus are simultaneously recorded by the camera. When the school bus is stopped with its stop-arm extended, the camera is effective to record vehicles that fail to stop as required by law.

In one form of the invention, an image recording system is provided for simultaneously recording images in different fields of view. The image recording system includes a camera and a lens of the camera for receiving images in a predetermined field of view. A redirecting mechanism is disposed in the predetermined field of view. The redirecting mechanism simultaneously redirects images in at least two fields of view that are not in the predetermined field of view through the lens. An image recording mechanism of the camera transfers the simultaneously received images through the lens onto an image recording medium. Accordingly, the system herein allows the camera to record images from a greater field of view than that provided by its lens.

Herein, when referring to manipulation of images, e.g. redirecting, receiving, transmitting, recording, displaying, etc., it will be understood that this can mean manipulating representations of the images such as provided by image forming light, electronic signals, or the like.

In a preferred form, the lens has a central axis, and the redirecting mechanism includes light reflective surfaces at predetermined angles relative to the central axis for reflecting images from at least two fields of view off the surfaces and through the lens.

In another form, the redirecting mechanism includes a prism having light reflected surfaces thereon. Use of the prism to capture images from different fields of view is significantly less expensive and less complicated to implement than prior systems using multiple cameras for capturing images from different areas about a vehicle.

In one form, the camera is a video camera and the image recording mechanism includes video tape on which the simultaneously received images are recorded. In this manner, the recorded images can be viewed at a later time, such as for determining the identity of vehicles that violate traffic laws.

The video camera can include a tape speed control for adjusting the speed at which the video tape records images thereon.

The camera can be a video camera including a mount for attaching the camera to a vehicle. A monitor can be provided inside the vehicle for simultaneously displaying the images from the two fields of view. This allows the vehicle operator to easily see the images in the different fields of view by viewing of the monitor.

The monitor can include a screen having a section of the screen for displaying images from one of the two fields of view and another section of the screen for displaying images from the other of the two fields of view. The camera lens can face out laterally from the vehicle. The redirecting mechanism redirects images from forwardly and rearwardly directed fields of view relative to the vehicle for recording oncoming and upcoming other vehicles.

In another form of the invention, a video camera system for vehicles, such as school buses is provided that simultaneously records images of cars from different predetermined areas about the bus. The video camera system includes a video camera mounted to the bus for recording images received from a first area about the bus. An imaging redirecting mechanism is provided in the first area that redirects images from predetermined second and third areas about the bus to the video camera so that images from the different predetermined areas are simultaneously recorded by the video camera. The present system is advantageous in that it increases the coverage of that provided by a standard video camera to allow it to record images from a greater area about the bus. In particular, the system herein minimizes camera costs while still being effective to record school bus stop-arm violators.

In one form, the second and third areas are distinct from each other.

In another form, the second and third areas are forwardly and rearwardly of the bus for simultaneously recording oncoming and approaching vehicles, respectively, relative to the bus. In this manner, stop-arm violators that do not stop when the arm is extended will be recorded by the video camera of the present system irrespective of from which direction they pass the arm.

Preferably, the video camera is mounted to the bus to face laterally out therefrom, and the redirecting mechanism includes light reflective surfaces at predetermined positions relative to the camera such that images from either side of the camera are reflected thereto.

In another aspect of the invention, a method is provided for recording images from different fields of view. The method includes positioning a camera so that it has a selected field of view, providing an image reflector in the predetermined field of view of the camera, redirecting images with the image reflector to the camera from at least two fields of view different from the camera selected field of view, and recording the redirected images from the at least two fields of view with the camera.

BRIEF DESCRIPTION OF THE DRAWINGS

FIG. 1 is an exploded perspective view of an image recording system and method in accordance with the present invention showing a redirecting mechanism in the form of a prism having reflective surfaces for redirecting images simultaneously from different fields of view through a camera lens with the images being fed to and displayed on a video display monitor and recorded by a recording mechanism;

FIG. 2 is a diagramatic view of the video camera, recording mechanism, and display monitor;

FIG. 3 is a perspective view of the image recording system mounted to the exterior of a school bus for simultaneously recording images forwardly and rearwardly of the bus;

FIG. 4 is a view similar to FIG. 3 and showing views from around the exterior of the school bus.

DETAILED DESCRIPTION OF THE PREFERRED EMBODIMENTS

Figure 5:
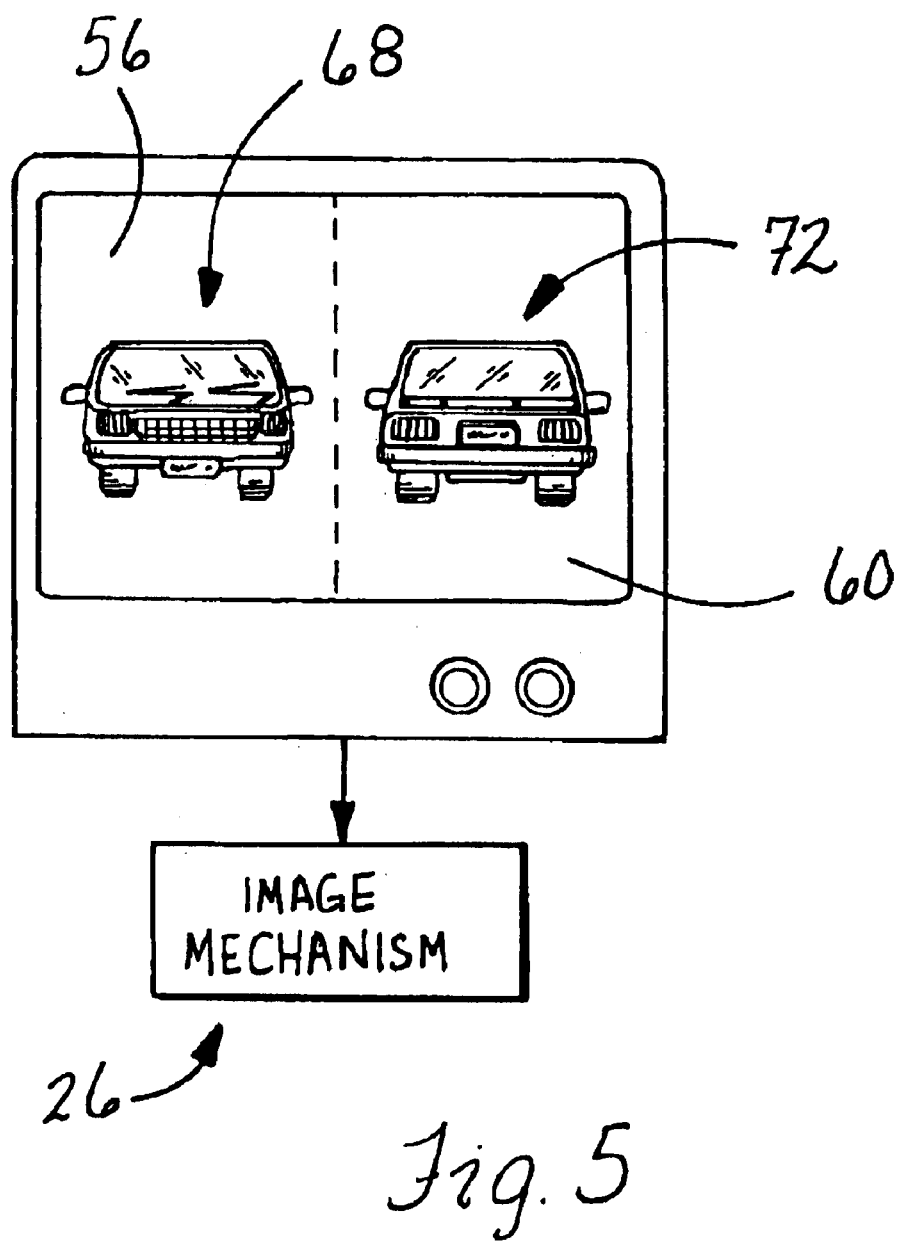
FIG. 5 is a view of the video display monitor located inside the school bus for simultaneously displaying the images of vehicles forward and rearward of the bus.

In FIG. 1, an image recording system and method, generally designated 10, in accordance with the present invention is illustrated. The image recording system 10 herein increases the coverage provided by a camera 12 having a predetermined field of view 14 so that images 16, 18 that are not in the field of view 14 can be recorded thereby. In this manner, the present system 10 maximizes the coverage or viewing area that can be provided by the camera 12 without requiring multiple such cameras for this purpose. Thus, the system 10 herein minimizes equipment expense associated with providing the large area of coverage needed or desired in particular instances, such as where the camera system 10 is used for recording images about a school bus 20, as shown in FIGS. 3 and 4 and as will be described more fully hereinafter.

To achieve the expanded field of view with the camera 12, a redirecting mechanism 22 is mounted externally of the camera 12 so as to be in the field of view 14, as best seen in FIG. 1. The redirecting mechanism 22 redirects images 16 and 18 to lens 24 of the camera 12 so that they can be simultaneously recorded via an image recording mechanism 26. In this manner, the redirecting mechanism 22 allows images 16 and 18 that are outside the camera's normal field of view 14 to be recorded for later viewing. In addition, the camera 12 of the image recording system 10 can be a video camera which is connected to a monitor 28 on which the images 16 and 18 can be displayed to allow for viewing of the images 16 and 18 as they are being recorded via the video camera 12 and the recording mechanism 26.

For redirecting the images 16 and 18 through the lens 24, the image redirecting mechanism 26 includes light reflective surfaces 30 and 32 at predetermined positions relative to the camera 12, and specifically the lens 24 thereof. The surfaces 30 and 32 are positioned or angled relative to central axis 34 of the lens 24 which bisects its field of view 14 so as to reflect image forming light, schematically depicted by lines 36 and 38 from respective images 16 and 18, through the camera lens 24 where the light 36 and 38 is processed for recording and display, as is known.

The image forming light transmitted through the lens 24 can be converted to video signals which are fed to the monitor 28 for display. The video signals can be analog, or they can be digital where a digital camera 12 is used. In addition, the image recording mechanism 26 can include an image recording medium such as magnetic video tape, magnetic disks or a solid-state memory, as is known. To implement the image recording system 10 herein, a commercially available video camera 12 can be utilized. The image recording mechanism 26 can be incorporated into the camera 12 with a transmission cable line 40 utilized to feed the video signals to the monitor 28 where it is disposed at a remote location from the video camera 12. This allows the system 10 in its preferred form to be used with a school bus 20 where the video camera 12 is mounted to the exterior of the bus 20 and the monitor 28 is mounted in the interior of the bus 20, as shown in FIG. 3. One preferred camera 12 is based on a small CCD imager that directs the image forming light received through its lens 24 at photo sites of a solid-state image sensor or semiconductor device to convert the light to electrical signals. The image recording medium in this instance can be a recording magnetic disk in the camera 12 where a magnetic recording head transfers the electronic signals to the spinning recording disk which records and stores the image data. To avoid moving parts, a solid-state memory can be used, as previously mentioned. Alternatively, image recording could be performed in a mechanism as described above but separate from and cabled to the camera 12 along signal transmission line 42. It will be appreciated that the present image recording system 10 can be implemented with a wide variety of video cameras 12 that are adapted to record video images, and preferably which can also display the images for viewing in real time.

As mentioned, the redirecting mechanism 22 includes light reflective surfaces 30 and 32. In the preferred and illustrated form, the light reflective surfaces 30 and 32 can be provided on a prism 44 that is mounted in front of the lens 24 so as to be in the camera's field of view 14, as can be seen in FIGS. 1 and 3. As illustrated, the prism 44 can be fixed relative to the camera module 12 in a housing 45 so that the central axis 34 extends through the juncture 46 between the surfaces 30 and 32 of the prism 44. Where the surfaces 30 and 32 form an angle of approximately 90° therebetween, the prism 44 will be effective to reflect image forming light from either side of the camera 12 through the lens 24. More particularly, the housing 45 includes side openings 45a and 45b in the form of slots that allow image forming light access to the reflective surfaces 30 and 32, respectively.

In this instance, it will be noted that the image recording system 10 herein records images that are in different fields of view, and more particularly, in two fields of view 50 and 52 that do not overlap with the preselected field of view 14 of the camera 12 as provided by the lens 24 thereof. As is known, the camera field of view 14 can be adjusted such as via as a zoom function that allows for adjustments between normal and wide viewing areas 14 for the camera lens 24.

In the illustrated form of FIGS. 3 and 4, where the image recording system 10 is used in conjunction with a school bus 20 to record violators of a bus stop arm 48, the camera's field of view 14 can be set to be relatively small as it only needs to capture the prism 44 therein. Where the prism 44 is further from the camera lens 24, the field of view 14 should be narrower, whereas with the prism 44 closer to the camera lens 24 the field of view 14 can be made to be slightly wider. By way of example, and not limitation, the camera field of view 14 can encompass a 46° horizontal viewing area as bisected by the lens central axis 34.

As mentioned, the image recording system 10 finds particular utility with a school bus 20 for recording violators of the stop arm 48 thereof. To this end, the prism 44 redirects images from the two different fields of view 50 and 52 which are forwardly and rearwardly directed, respectively, relative to the bus 20, as best seen in FIG. 4. In this manner, both oncoming and upcoming vehicles that pass the extended stop arm 48 will be recorded as they pass through the forwardly directed and rearwardly directed fields of view, 50 and 52.

It is also possible for the different fields of view 50 and 52 to overlap with the camera field of view 14, such as might be desired where the image recording system 10 is implemented in a building security system. In this instance, the prism 44 can be provided such that the reflective surfaces 30 and 32 thereof have a smaller included angle therebetween and/or the field of view 14 can be wider such as where the prism 44 is mounted closely adjacent the camera lens 24. In any event, it is apparent that the present recording system 10 allows for a single camera 12 to be utilized where broader coverage is needed over that provided by the camera's maximum field of view 14. In this regard, the present system 10 allows the camera's field of view 14 to be expanded over that available through the camera lens 24 by use of the redirecting mechanism 22. This allows images that otherwise would not fall within the camera's maximum field of view 14 to be recorded by the camera recording mechanism 26. As is apparent, this greatly simplifies the system herein 10 vis-a-vis prior systems that have to employ multiple cameras to record images in fields of view that are different than that provided by the system camera 12 such as in different areas about a vehicle or school bus.

Referring next to FIGS. 1, 3 and 5, it can be seen that the monitor 28 preferably includes a screen 54 where different portions of the screen 54 display images 16 and 18 from the respective different fields of view 50 and 52. Accordingly, image 16 in field of view 50 is displayed on the left portion 56 of the screen 54 as video image 58, and image 18 in field of view 52 is displayed on right portion 60 of the screen 54 as video image 62. It should be noted that the images 16 and 18 both enter the camera 12 via the lens 24 thereof so that the images 58 and 62 displayed on the screen 54 take up the same proportion of the screen 54 as the relative sizes between the respective field of views 50 and 52 as redirected through the lens 24 via the prism 44. In this manner, an operator of the bus 20 can simultaneously view the images in the fields of view 50 and 52 forward and rearward of the school bus 20 as they approach and pass the bus stop arm 48. Such viewing of violators of the bus stop arm 48 can be useful in allowing the operator to later verify that what was recorded was actually witnessed in real time, albeit via the video monitor 28. The operator can also use the monitor 28 to alert them to the presence of those oncoming and upcoming vehicles that the operator anticipates will be violating the stop arm 48. The monitor 28 in the school bus 20 allows the operator to keep their attention on the passengers entering or exiting the bus rather than on the road ahead or the rearview mirror to check for potential stop arm violators. However, once they see a potential violator on the monitor 28, they can then switch their focus to direct their viewing outside the bus toward the vehicles themselves.

As FIGS. 4 and 5 depict, the system 10 herein can also assist in identifying stop arm violators by providing images of both the front and the back of the vehicle. More specifically and referring to FIG. 4, as vehicle 64 approaches the bus 20 and passes through the field of view 52, the monitor 28 will display the front portion 66 thereof as video image 68 on screen portion 56. After the vehicle 54 leaves the field of view 52 and passes the stop arm 48, the vehicle 64 enters the camera's field of view 50 as afforded by the prism 44, and the rear portion 70 of the vehicle 54 will be displayed as video image 72 on the screen portion 60. In addition to the advantage of having both views of the passing vehicle 64 to allow it to be better identified, an additional advantage is provided when a vehicle lacks a license plate either at the front or rear thereof. Because the single camera 12 is effective to capture images in both the rearwardly directed area 52 and the forwardly directed area 50 relative to the bus 20, a vehicle 64 will have its plate recorded by the present system 10 even if one of its plates is missing.

The monitor screen 54 can be a CRT or LCD. For example, with an LCD screen 54, there will be an LCD driver that is responsive to a microprocessor controller for generating an LCD drive voltage, as is known. The LCD driver can supply row and column drive signals to each screen portions 56 and 60 under control of the microprocessor and which are based on the output electrical signals generated by the semiconductor device of the CCD camera 12, for instance.

Turning next to more of the details, the camera 12 preferably has a modular form such as where it is a small CCD or CMOS imager and is contained within a compact cylindrical canister housing 74, as shown in FIG. 1. The camera 12 can have a small fixed focus or variable focus lens 24, and automatic exposure control. The camera lens 24 can be a normal or wide angle or, as mentioned, can include a zoom function which allows for adjustments between normal and wide positions. The image recording mechanism 26 can include a speed control that allows the rate at which images are recorded to the image recording medium to be increased so as to conserve space thereon. In other words, the control allows the number of frames of video per second that are recorded to be adjusted.

To provide the camera 12 with a sturdy construction a pair of spaced plate members 76 and 78 are attached at either end of the housing 74. The plates 76 and 78 can have a square shape with sides longer than that of the housing diameter. The plates 76 and 78 are preferably centered about the axis 34 so that the housing 74 extends centrally therebetween. The plates 76 and 78 can be securely connected together by way of four attachment posts 80 extending between the corners of the plates. The camera 12 can include an electrical connector 79 projecting beyond the rear plate 78 to allow lines 40 and 42 to be attached thereto.

The camera 12 is mounted to the exterior of the bus 20 such as on the driver side 81 thereof so that the camera lens 24 faces laterally outward therefrom. To this end, plate 78 can be attached at the back of the housing 45 which, in turn, can be flush mounted against the driver side 81 as shown in FIG. 3 adjacent hinged attachment 82 of the stop arm 48 to provide a mount for the camera to the bus. In this regard, the camera 12 and stop arm 48 are attached to the bus 20 on the driver side 81 near the front of the bus 20 with the housing 45 being displaced from the hinge 82. The prism 44 can be mounted at the front of the housing 45 or at some other position intermediate the lens 24 and housing front so that the prism 44 will reside in the camera's field of view 14. In this manner, the reflective surfaces 30 and 32 will be in position to redirect image forming light simultaneously from both the forwardly and rearwardly directed areas 50 and 52 relative to the bus 20 through the camera lens 24.

With respect to the video monitor 28, it can be mounted in the bus interior 84 such as in the corner adjacent passenger door 86, as shown in FIG. 3. This allows the bus operator while looking in the general direction of the door 86 as passengers exit and enter the bus 20 to be readily able to also glance at the monitor 28 to gain a view of the areas 50 and 52 about the bus 20 to see the oncoming and upcoming traffic.

While there have been illustrated and described particular embodiments of the present invention, it will be appreciated that numerous changes and modifications will occur to those skilled in the art, and it is intended in the appended claims to cover all those changes and modifications which fall within the true spirit and scope of the present invention.

What is claimed is:

1. An image recording system for simultaneously recording images in different fields of view, the image recording system comprising:

a camera;

a lens of the camera for receiving images in a predetermined field of view;

a redirecting mechanism disposed in the predetermined field of view which simultaneously redirects images in at least two fields of view that are not in the predetermined field of view through the lens; and an image recording mechanism of the camera for transferring the simultaneously received images through the lens onto an image recording medium, wherein the redirecting mechanism comprises a prism having light reflective surfaces thereon with the prism being fixed relative to the camera.

2. The image recording system of claim 1 wherein the lens has a central axis, and the redirecting mechanism includes light reflective surfaces at predetermined angles relative to the central axis for reflecting images from at least two fields of view off the surfaces and through the lens.

3. The image recording system of claim 1 wherein the camera is a video camera and the image recording mechanism includes video tape on which the simultaneously received images are recorded.

4. The image recording system of claim 3 wherein the video camera includes a tape speed control for adjusting the speed at which the video tape records images thereon.

5. The image recording system of claim 1 wherein the image recording mechanism includes a solid-state system, and the camera includes a video camera having a control for allowing the number of frames of video per second that are recorded to be adjusted.

6. The image recording system of claim 1 wherein the camera is a video camera that includes a mount for attaching the camera to a vehicle, and a monitor of the video camera inside the vehicle for simultaneously displaying the images from the two fields of view.

7. The image recording system of claim 6 wherein the monitor includes a screen having one portion of the screen for displaying images from one of the two fields of view and another portion of the screen for displaying images from the other of the two fields of view.

8. The image recording system of claim 6 wherein the camera lens faces out laterally from the vehicle, and the redirecting mechanism redirects images from forwardly and rearwardly directed fields of view relative to the vehicle for recording oncoming and upcoming other vehicles.

9. A video camera system for a school bus that simultaneously records images of cars from different predetermined areas about the bus, the video camera system comprising:

a video camera mounted to the bus for recording images received from a first preselected area about the bus; and an image redirecting mechanism in the first area configured and arranged to redirect images from predetermined second and third areas about the bus to the video camera so that images from the different predetermined areas are simultaneously recorded by the video camera with the second and third areas being separated from and non-overlapping with each other with the corresponding images from the second and third areas being distinct from each other, and the second and third areas being generally at opposite ends of the bus forwardly and rearwardly of the bus for simultaneously recording distinct images of oncoming and approaching vehicles, respectively, relative to the bus.

10. The video camera system of claim 9 including a monitor in the bus that displays the images that are simultaneously recorded to allow an operator of the bus to view the images in the different predetermined areas by viewing the monitor.

11. The video camera system of claim 9 wherein the video camera is mounted to the bus to face laterally out therefrom, and the redirecting mechanism includes light reflective surfaces at predetermined positions relative to the camera such that images from either side of the camera are reflected thereto.

12. A method for recording images from different fields of view, the method comprising:

positioning a camera so that it has a selected field of view;

providing an image reflector in the predetermined field of view of the camera;

redirecting images with the image reflector to the camera from at least two fields of view different from the camera selected field of view;

recording the redirected images from the at least two fields of view with the camera; and feeding the redirected images to a remote monitor as they are being recorded to allow for real-time viewing of the images from the different fields of view.

13. The method of claim 12 including mounting the camera to a school bus so that when the school bus is stopped to pick up or drop off children the selected field of view of the camera is generally directed laterally out from the bus, and the image reflector redirects images from generally forwardly and rearwardly directed fields of view relative to the stopped bus.

14. The method of claim 12 wherein images are redirected from different fields of view that do not overlap each other.

15. The method of claim 12 wherein the image reflector is provided to reflect images from different fields of view that do not overlap with the camera selected field of view.

* * * * *